A. PEEL.
COMBINED LIGHT AND INDICATING PLATE FOR MOTOR VEHICLES.
APPLICATION FILED JULY 20, 1921.
1,405,157.
Patented Jan. 31, 1922.
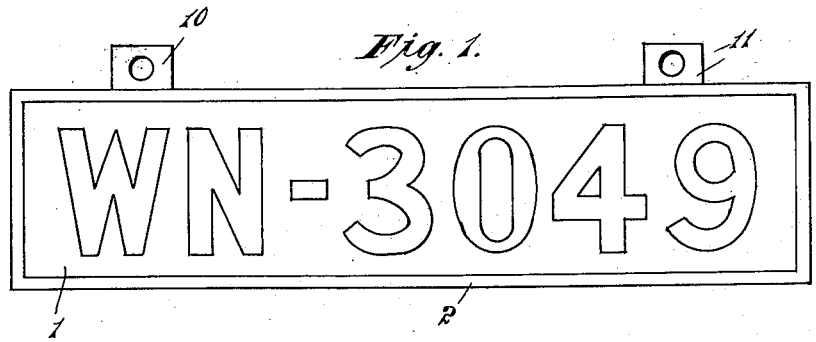
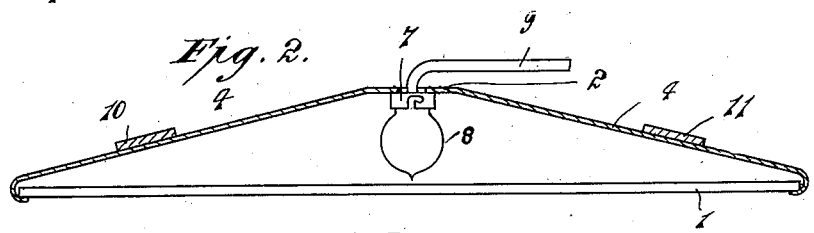
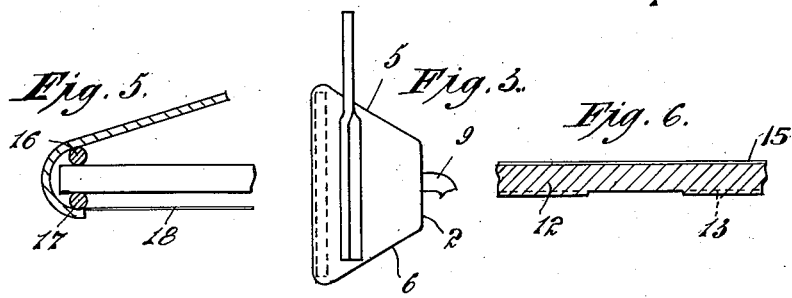
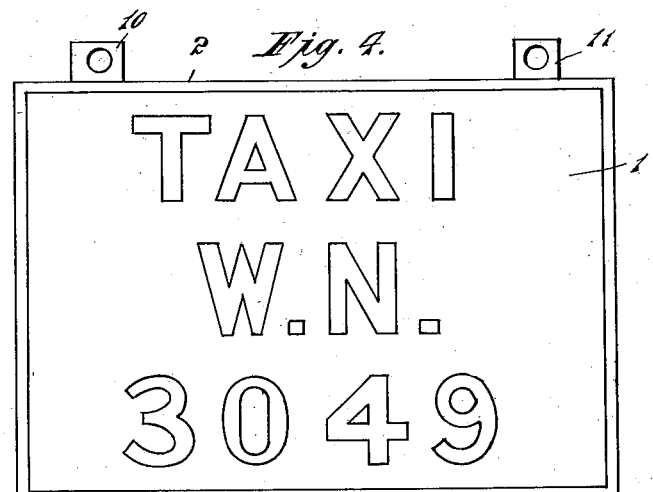
Alice Peel, Inventor
By William Clinton, Atty

UNITED STATES PATENT OFFICE.

ALICE PEEL, OF WELLINGTON, NEW ZEALAND.

COMBINED LIGHT AND INDICATING PLATE FOR MOTOR VEHICLES.

1,405,157. Specification of Letters Patent. Patented Jan. 31, 1922.

Application filed July 20, 1921. Serial No. 486,153.

*To all whom it may concern:*

Be it known that I, ALICE PEEL, a subject of the King of Great Britain and Ireland, residing in Wellington, in the Dominion of New Zealand, have invented a new and useful Improvement in Combination Lights and Indicating Plates for Motor Vehicles; and I do hereby declare the following to be a full, clear, and exact description of the same.

This invention relates to an indicating plate for motor vehicles which may at the same time provide by night the desired coloured light.

The object of the invention is to provide an indicating plate upon which numbers can be clearly shown by daylight for the purpose of identification for indicating desired information, and which will also show such information and identification by night and at the same time showing the desired coloured light.

According to my invention, the device is made in a box like form having a front of coloured glass, while marks, numbers, letters or the like forming the indicating or identification means are formed in the face of the coloured glass by removing the surface of the glass to the depth of the coloured layer by means of an acid process, thereby cutting permanently the numbers or the like indicating means in the glass. The letters or marks are thus clear glass and surrounded by the uncut coloured glass. The back of the plate is then painted in such a way that a light behind the plate will illuminate the plate by night and show the letters, marks or the like according to the colour of the glass.

Such a device may be employed on motor vehicles as a number plate by day or by night, and by night the light through the coloured glass will afford the required coloured light for the rear of the vehicle. The device may also be employed upon the front of the vehicle to display the number of the vehicle and other information, such as whether the vehicle is for hire.

The invention is illustrated in the accompanying drawings, wherein:—

Figure 1, is a front elevation of one form of the device.

Figure 2, is a sectional plan of the device.

Figure 3, is an end view.

Figure 4, is an elevation of a slightly different form of the device.

Figure 5, and

Figure 6, are enlarged views of details.

Referring to the drawings, the device comprises a plate 1 of ruby or other coloured glass, forming the front of a casing 2 which is formed of metal, the sides 4 of which slope towards the ends of the plate, and the top and bottom sides 5 and 6 also slope towards the top and bottom edges of the plate 1 respectively. At the apex of this angularly shaped casing a fitting 7 is affixed to accommodate an electric bulb 8, the wiring 9 being conveniently led thereto. The casing, however, may be modified in shape to suit acetylene or oil lamps. Lugs 10 and 11 having holes for the purpose of attaching to a convenient portion of the vehicle are fixed to the rear sides of the device.

The plate 1 has numbers or letters formed in it as follows:—12 indicates the thickness of the coloured glass and the dotted lines 13 the depth to which one face of the glass is coloured. The letters, marks or the like are formed by cutting away the glass to the depth of the portion 13, thus leaving the glass clear the width of the letter or mark, as indicated at 14. The rear of the glass is then given a coat of paint indicated at 15 of a sufficient density that the letters from the front will appear to be white against the darker ground of the glass, but not dense enough to prevent light, when such plate is illuminated from behind the plate shining through the letters and through the coloured glass without destroying the colour thereof, thereby illuminating the white paint, thus causing the letters to appear white against the natural colour of the glass.

The plate 1 is held firmly in position in the rim of the casing by means of a rubber or metal rim 16 against which the plate rests, while another rim 17 of metal upon the outside of the plate retains the plate firmly against the rim 16.

The front of the glass plate may, if desired, be protected by a wire netting of desired mesh, which netting may be attached to the rim 17 as shown at 18 in Figure 5.

What I claim is:—

In an indicating device for motor vehicles, a casing, a plate of glass forming the front wall of said casing, illuminating means arranged within said casing, a portion of the thickness of said glass being coloured on the front side, letters or other indicating marks formed in said plate by removing the glass forming the letters to a depth corresponding to the depth that the glass is coloured, and a translucent coat of paint of another colour applied to the rear of said glass plate substantially as described.

In testimony whereof, I have signed my name to this specification in the presence of two subscribing witnesses.

ALICE PEEL.

Witnesses:
EDMOND PATRICK O'DONNELL,
CLIFFORD PEEL.